Figures 1, 2:
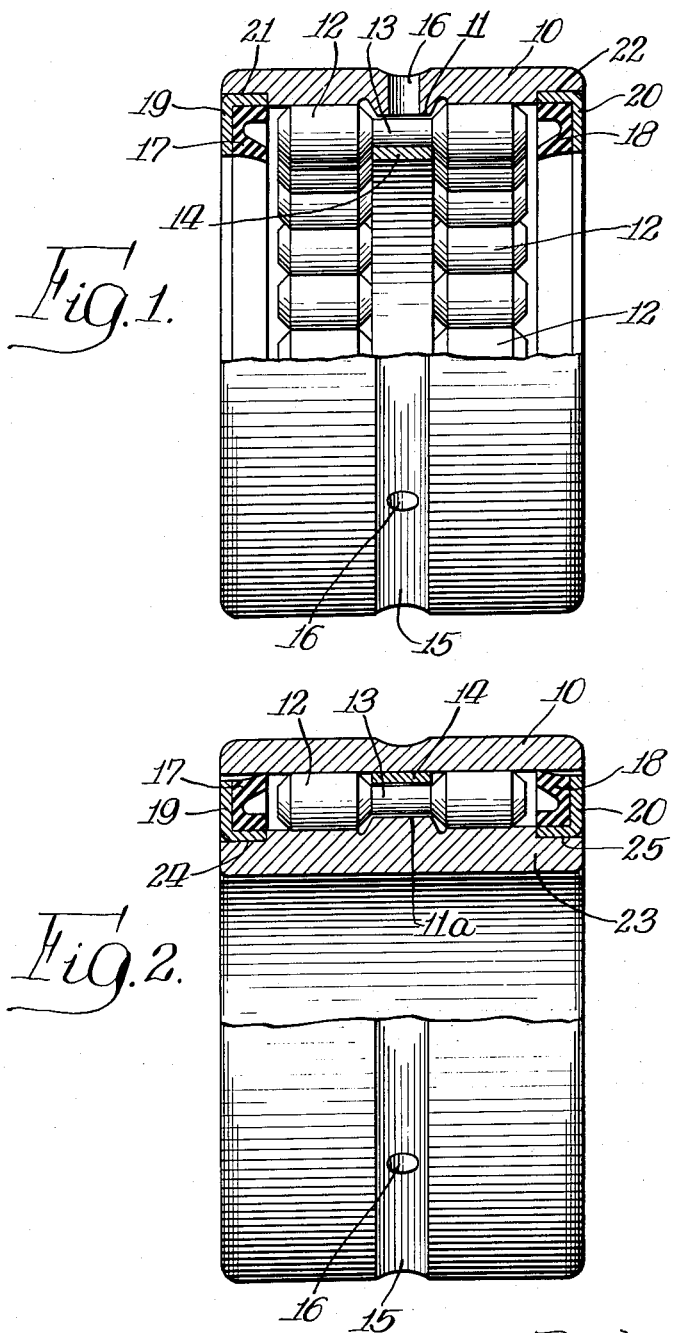

May 29, 1956     R. J. SMITH     2,747,949

SELF-CONTAINED SEAL AND BEARING ASSEMBLY

Filed Aug. 15, 1953

INVENTOR.
Richard J. Smith,
BY
Foorman L. Mueller
Atty.

United States Patent Office 2,747,949
Patented May 29, 1956

2,747,949

SELF-CONTAINED SEAL AND BEARING ASSEMBLY

Richard J. Smith, Valparaiso, Ind., assignor to McGill Manufacturing Company, Inc., Valparaiso, Ind., a corporation of Indiana Application April 15, 1953, Serial No. 348,852

1 Claim. (Cl. 308—187.2)

The present invention relates to bearing assemblies and more particularly to an improved bearing assembly that includes a self-contained sealing means for excluding dirt and for retaining grease or oil within the assembly.

Self-contained seals in bearing assemblies for the above mentioned purposes are known and are found generally in ball bearing structures. In ball bearing assemblies, the balls are held between inner and outer races in such a manner that there is no axial motion between the races and adequate seals can usually be provided since there is no possibility of the balls or races becoming jammed against the seals. The usual roller bearing, on the other hand, consists essentially of an inner race, an outer race with a plurality of elongated rolls disposed in the annular space between the races. In order to support and prevent endwise movement of the rolls and to confine them between the races, one race (usually the outer) is provided with a flange at each end. Due to the presence of such end flanges, it is difficult to mount a self-contained seal in such assemblies, and this type of bearing is usually marketed without a self-contained seal.

In another type of roller bearing, the rolls each have an intermediate portion of restricted section, and the outer or inner race has a guide rail which cooperates with such restricted portions to take up the longitudinal thrust so that no retainers or flanges are needed at the ends of the races for maintaining the rolls in place. Due to the fact that the latter type of bearing does not have end flanges supporting the rolls, there is space for a self-contained seal at each end of the bearing. However, since there is some relative axial motion between the races, or between the rollers and race in this type of unit, satisfactory seals that will not jam the bearing and yet which may be mounted easily and economically and properly perform their sealing function have not, to applicant's knowledge, heretofore been devised. It is with the incorporation of a satisfactory self-contained seal in the latter type of bearing assembly that the present invention is primarily concerned, although the invention may be applied to the other types of bearings discussed previously herein.

In the last-mentioned type of bearing, in which the rolls are supported in the center, it is most desirable that the open ends of the races be sealed so that lubricant may be maintained within the bearing and a protection against dirt may be provided. In order to provide a seal for this type of bearing, many users have resorted to the expedient of mounting an extraneous seal at one or both of the ends of the bearing. This, however, is unduly awkward and burdensome to the consumer, since it usually requires a counter-bored section on the shaft on which the bearing is mounted and against which the seal extends. Moreover, it is usually necessary to provide a cover plate fastened to the shaft housing for retaining the seal in place, as well as a counterbored section in the housing for receiving the seal. For the above reasons, the provision of a self-contained seal in the bearing itself is most desirable.

It is accordingly an object of the present invention to provide a bearing assembly which may be of the last-described type and which incorporates an improved self-contained sealing means which precludes the necessity of providing separate and extraneous seals for such bearings.

A more general object of the invention is to provide an improved bearing assembly which is constructed to incorporate a new improved and highly satisfactory self-contained sealing means for maintaining lubricant within the bearing and for excluding dirt and other extraneous and unwanted matter.

A further object of the invention is to provide such an improved bearing assembly that may be constructed cheaply and expeditiously.

A feature of the invention is the provision of an improved sealing means in a bearing assembly in which a flexible washer of sealing material is retained in friction fit at one or both ends of the bearing by means of a simple retaining ring.

The above and other features of the invention which are believed to be new are set forth with particularity in the appended claim. The invention itself, however, together with further objects and advantages thereof may best be understood by reference to the following description when taken in conjunction with the accompanying drawing in which;

Figure 1 shows, partly in section, a bearing assembly constructed in accordance with the invention; and Figure 2 is a modification of the invention.

The improved bearing assembly of the invention has at least one cylindrical race with at least one open end and has a plurality of rolling elements mounted adjacent the race. A sealing washer is disposed at the open end of the aforesaid race, and a retaining washer is disposed adjacent to and coaxial with the sealing washer. Each of the washers has a bent-over annular portion so that they each have an L-shaped peripheral cross-section. The bent-over portion of the retaining washer engages the race adjacent its open end and is forced into a friction fit with the race by the bent-over portion of the sealing washer. In this manner, both washers are retained by the race with the sealing washer sealing the aforementioned open end.

The bearing assembly of Figure 1 is of the type which includes an outer race but no inner race, the rolling elements themselves engaging the shaft or other member on which the bearing is mounted. The bearing includes an outer cylindrical race 10 which has a guide rail 11 formed integral therewith, the guide rail extending inwardly from the inner peripheral surface of the race intermediate the ends thereof. The bearing also includes a plurality of rolling elements or rolls 12 of a selected diameter and each having a portion 13 of restricted or reduced section intermediate its ends and engaging guide rail 11. The bearing also includes an inner resilient retaining spring ring 14 coaxial with guide rail 11, and the retaining ring bears against the restricted portions 13 of rolls 12 to hold the rolls securely against the guide rail. The bearing also includes an annular lubricating groove 15 about its outer periphery, and the groove has apertures 16 extending into the interior of the bearing and terminating at points around guide rail 13 adjacent the restricted portions 13 of the rolls.

The sole support for the rolls 12 within the bearing is at their intermediate sections 13 and, since there is no need for retainers or supporting flanges for the rolls at the ends of race 10, such ends are normally left open. As previously stated, difficulties have been encountered in providing a suitable seal for such open ends which may be constructed simply and economically and yet which will perform efficiently to maintain the lubricant within the bearing and exclude extraneous matter. In accordance with the present invention, the ends of race 10 are provided with a pair of counterbores 21 and 22, and a pair of sealing washers 17 and 18, each composed of a suitable resilient sealing material such as rubber or felt, is mounted in the bores in the following manner. A pair of flexible metal retaining washers 19 and 20 is affixed to the respective sealing washers coaxially therewith. The latter washers may take the form of a metal backing affixed to sealing washers 17, 18. Each sealing washer and its corresponding retaining washer constitutes a sealing device, and the washers in each sealing device each have a bent-over annular portion so that each sealing device has the illustrated L-shaped peripheral cross-section. Moreover, the radially extending portion of each sealing washer projects inwardly toward the shaft on which the bearing is mounted to enclose the open ends of the bearing. The bent-over portion of each of the metallic washers 19, 20 engages the inner peripheral surface of race 10 within the respective counterbores 21 and 22, and the bent-over portions of sealing washers 17 and 18 resiliently force the metallic washers into a friction fit with the race within the aforementioned counterbores. In this manner, sealing washers 17 and 18 are supported so that they may effectively seal the open ends of race 10.

The sealing arrangement 17—20 can be constructed economically and can be mounted with great facility into the bearing unit to constitute a self-contained seal therefor. Due to the simplicity of the sealing devices they can be mounted a sufficient distance from the ends of the rolls 12 so that slight axial motion of the rolls will not cause jamming with the sealing devices. Bearing assemblies, constructed in the manner described above to incorporate self-contained seals, have been found to operate with a high degree of efficiency; such bearings providing their own seal for lubricant and against extraneous matter without the need for the user to procure and mount independent seals.

The embodiment of Figure 2 is similar in most respects to that of Figure 1 with the exception that it also incorporates an inner cylindrical race 23 in addition to outer race 10. Rolls 12 are supported against guide rail 11a formed integral with the inner race by retaining ring 14 which, in this instance, encircles the restricted sections of the rolls. In the latter embodiment, the sealing means 17—20 is supported on the inner race with the bent-over annular portions of washers 19 and 20 being forced by washers 17 and 18 into a friction fit with the outer peripheral surface of race 21 in counterbores 24, 25. However, the sealing means may be supported on the outer race in the manner shown in Figure 1 if so desired.

The invention provides, therefore, a new and improved bearing assembly which incorporates a highly efficient self-contained sealing means to obviate any necessity for the provision of extraneous seals for the unit when put to its intended use. As previously pointed out, the sealing means of the present invention is particularly suited for use in roller bearing assemblies in which the rolls are supported at an intermediate restricted portion, since the sealing means is constructed to enclose the resulting open ends of the races in a simple and facile manner.

While particular embodiments of the invention have been shown and described, modifications may be made and it is intended in the appended claim to cover all such modifications as fall within the true spirit and scope of the invention.

I claim:

A roller bearing assembly having a self-contained sealing means for excluding dirt and for retaining lubricant in the assembly including in combination, an open-ended cylindrical race ring having a raceway on the inner surface thereof, a series of rollers disposed within the axial limits of said raceway and each roller having a depressed annular portion, said race ring having first and second end portions respectively adjacent the two open ends thereof and extending axially beyond said rollers a distance sufficient to provide a friction mount for respective members to be supported thereon, annular guiding means integral with said race ring, centrally thereof and positioned within the depressed portion of each roller for limiting axial motion of said rollers and for retaining said rollers in position within said raceway, so that there is no end thrust on a roller so as to move that roller axially into either the first or the second end portions, said race ring having an annular lubricating groove extending around its outer periphery and having at least one aperture extending therethrough from said groove for introducing lubricant into the roller bearing assembly, respective members supported in friction mount on the race ring, with each of said respective members comprising a resilient rubber sealing washer affixed to a metallic washer in coaxial relation therewith, said metallic washer having a bent-over axially-extending annular portion and a radial inwardly-extending portion, with said sealing washer being embraced within said metallic washer and said sealing washer having a portion extending radially inwardly beyond the radially-extending portion of said metallic washer, and said annular portion of said metallic washer engaging the corresponding one of said end portions of said race ring and being forced thereagainst by said sealing washer when said roller bearing assembly is fully mounted for a bearing operation and the sealing washer is performing its sealing function, with said sealing washer thereby assisting in retaining the metallic washer in friction fit with said race ring and with said sealing washer sealing that corresponding one of said open ends of said race ring.

References Cited in the file of this patent

UNITED STATES PATENTS

| | | |
|---|---|---|
| 592,807 | Mattison | Nov. 2, 1897 |
| 1,963,704 | Johnson | June 19, 1934 |
| 2,071,198 | Chambers | Feb. 16, 1937 |
| 2,274,137 | Frauenthal et al. | Feb. 24, 1942 |
| 2,334,227 | Stallman | Nov. 16, 1943 |
| 2,415,888 | Joy | Feb. 18, 1947 |